Aug. 23, 1938.   L. L. LADD   2,127,742
TUNNEL KILN
Filed April 30, 1936   4 Sheets-Sheet 1
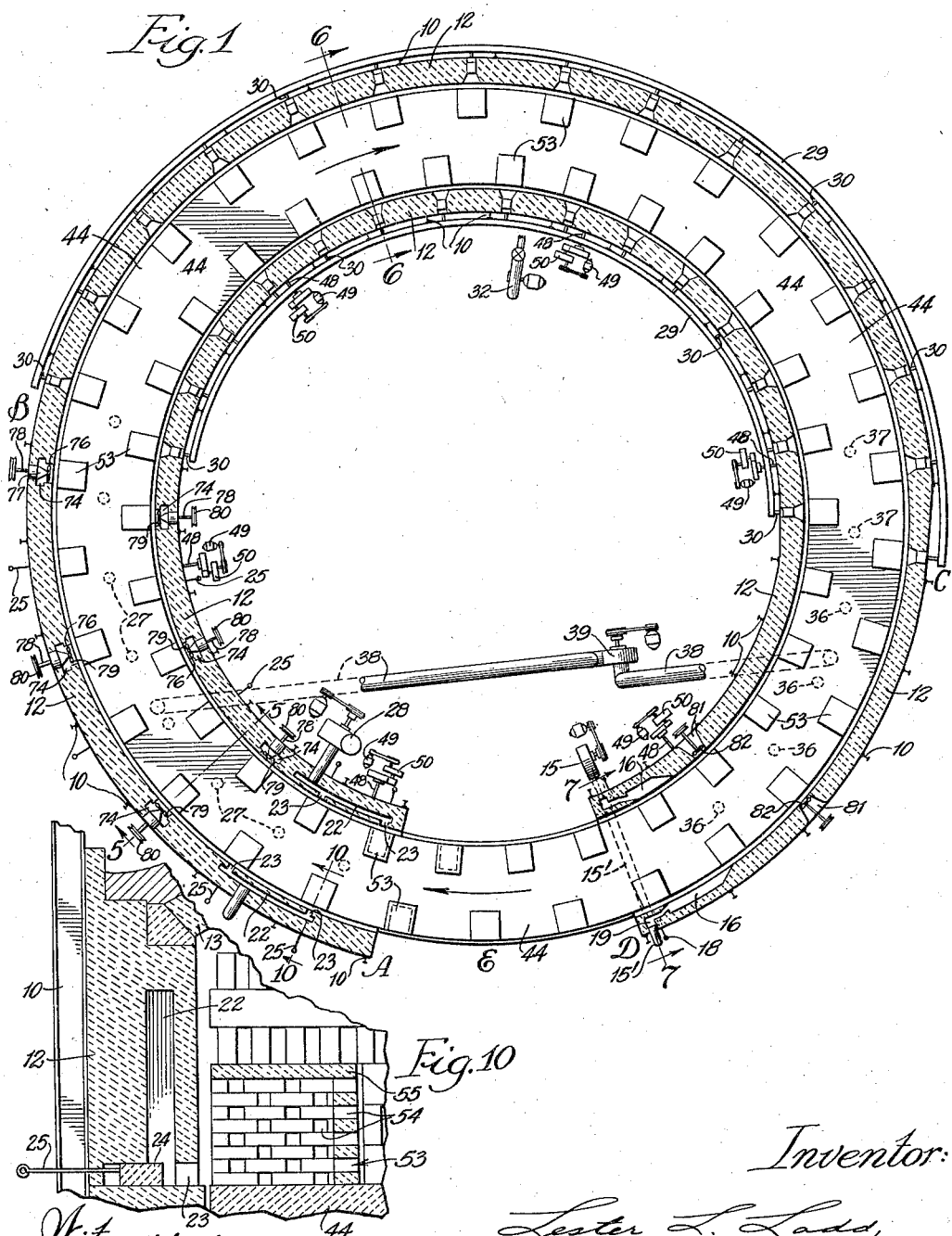

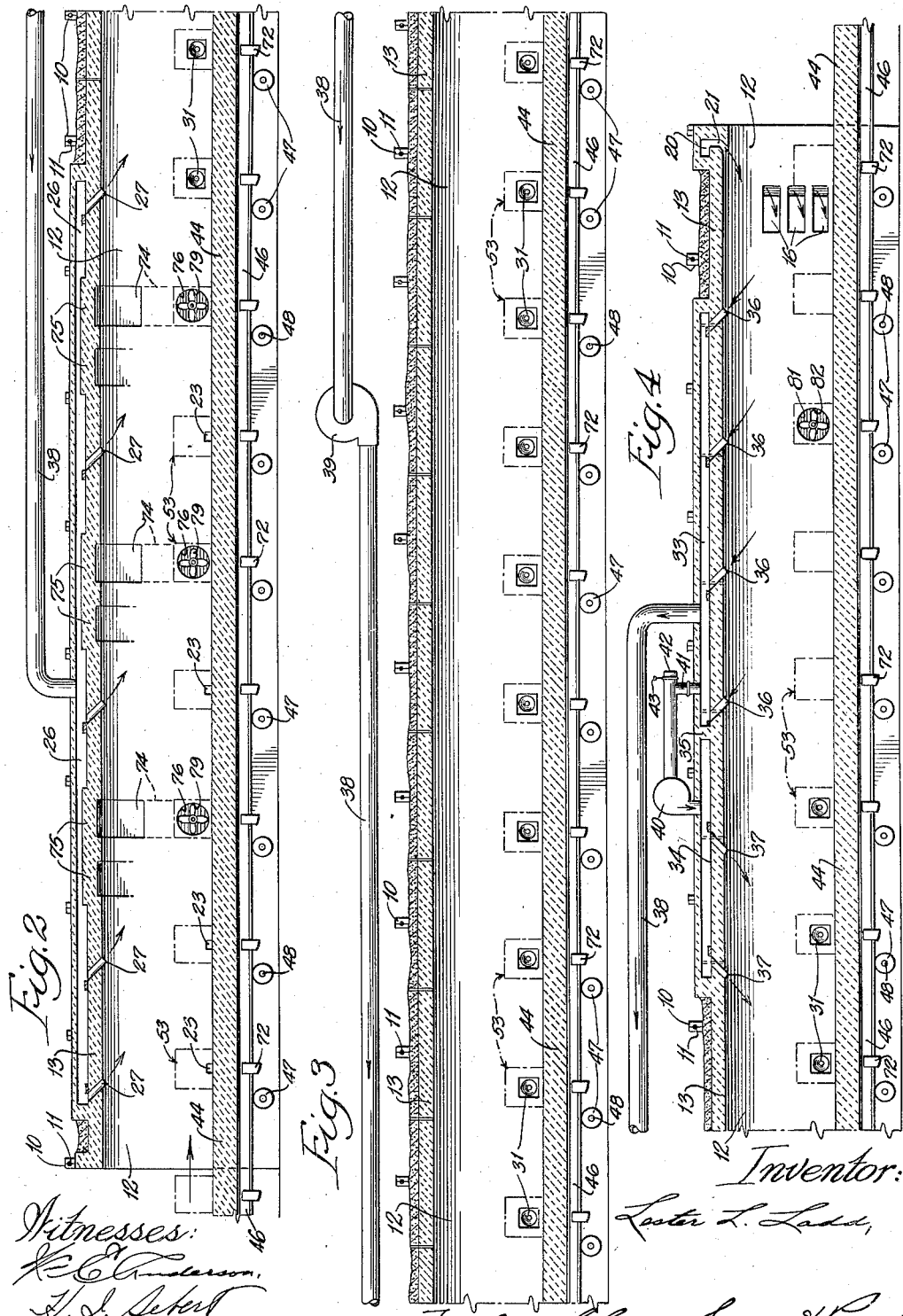

Aug. 23, 1938.  L. L. LADD  2,127,742

TUNNEL KILN

Filed April 30, 1936    4 Sheets-Sheet 3

Witnesses:

Inventor:
Lester L. Ladd,
Fisher, Clapp, Soans & Pond,
Attys.

Aug. 23, 1938.　　　L. L. LADD　　　2,127,742
TUNNEL KILN
Filed April 30, 1936　　　4 Sheets-Sheet 4
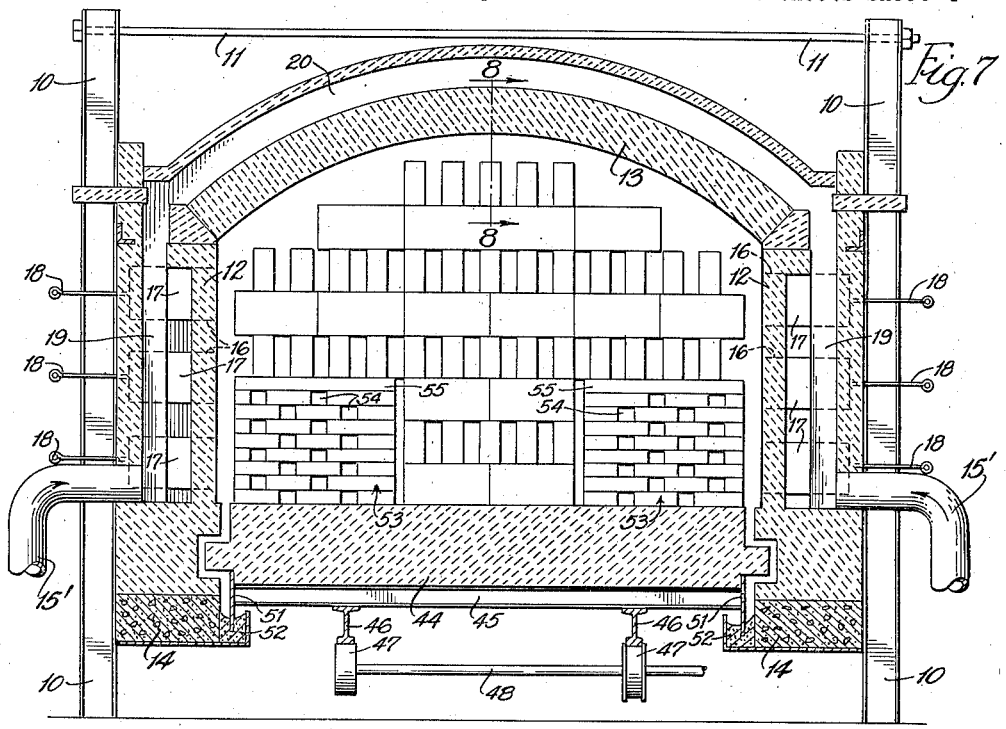
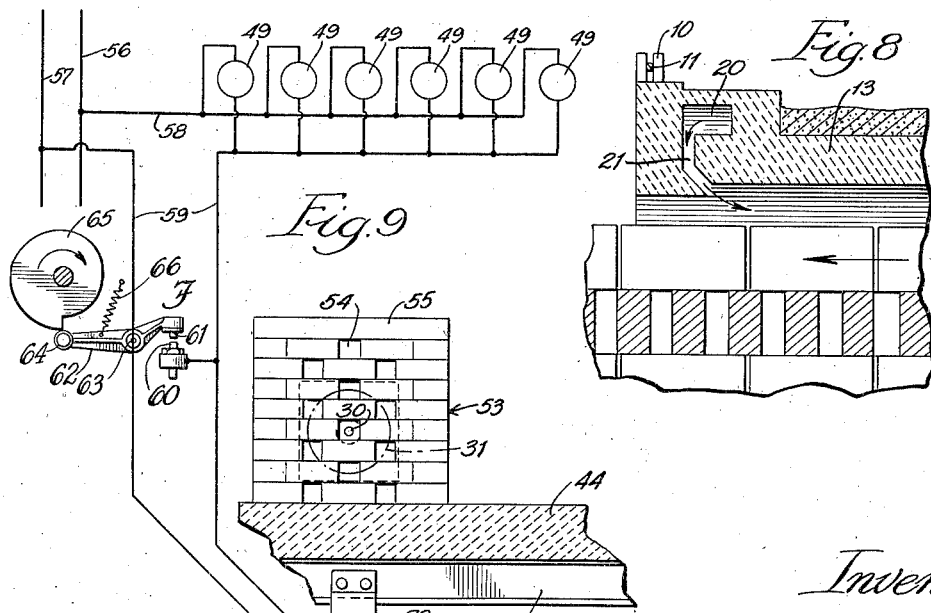
Inventor:
Lester L. Ladd Patented Aug. 23, 1938

2,127,742

UNITED STATES PATENT OFFICE 2,127,742

TUNNEL KILN

Lester L. Ladd, Lockport, Ill.

Application April 30, 1936, Serial No. 77,130

12 Claims. (Cl. 25—142)

This invention relates to tunnel kilns particularly adapted for use in firing ceramic products. Some tunnel kilns are of the straight type, in which the ware travels on trucks or cars; and others are of the circular type, in which the ware travels through the kiln on a circular conveyor. Typical circular kilns are illustrated in my former Patents No. 1,842,411, January 26, 1932, and No. 1,903,117, March 28, 1933. The present invention is primarily intended for use in a circular tunnel kiln, although many features thereof may be applied to kilns of the straight type.

Tunnel kilns are further classified as muffle kilns and open kilns. In the muffled type of kiln, a refractory wall is positioned between the ware and the firing chamber to prevent the gases of combustion from reaching the ware, which, in the case of some types of ware is injurious to the latter. In the open type of kiln, the combustion gases are discharged directly into the center of the kiln in contact with the ware.

All types of tunnel kilns have what are known as a pre-heating zone, a firing zone, and a cooling zone, through which the ware travels successively in the order named. In the pre-heating zone it is necessary to gradually raise the temperature of the ware up to the vitrification point to prevent cracking but, after the vitrification point is reached, the temperature of the ware may be quickly raised to the peak temperature in the firing zone without cracking the goods. After the ware leaves the firing zone, it may be quickly cooled to a point considerably below the vitrification point, and should then be cooled more gradually.

The hot gases or highly heated air employed for raising the temperature of the ware to the desired or required points has heretofore been introduced into the firing zone of the kiln through the side walls thereof and, in the open type of kiln directly into the presence of the ware on the conveyor. As heated air or gas of course tends to rise, one undesirable result has been that the ware was unevenly heated, the upper portion of the ware on the conveyor being over-heated and the lower portion under-heated, so that the ware as a whole was unevenly baked. An important object of this invention has been to remedy this defect, and this has been accomplished mainly by providing on the top of the conveyor itself a series of combustion chambers of substantial height relatively to the height of the tunnel formed with perforated side walls, around which the ware is packed. These chambers, in the preferred form of the invention herein shown, are arranged in circular rows, one row bordering the outer edge of the conveyor and the other the inner edge, and the individual units of the two rows being relatively staggered. As the conveyor travels through the tunnel, these combustion chambers are successively brought directly opposite the usual gas burners, or, where heated air may be employed as the firing medium, opposite the inlet nozzles of the hot air, so that the hot gas or air is first dispersed through the interior of each chamber and from the latter issues forwardly, rearwardly, and sidewise through the checker walls into the presence of the lower portion of the ware on the conveyor, whence it rises and is effectively dispersed throughout the entire cross section of that portion of the tunnel above the conveyor and thus exerts a substantially uniform and even baking effect on the ware.

In all circular tunnel kilns, so far as I am aware, it has hitherto been the practice to give the conveyor a very slow continuous travel through the kiln tunnel, the customary period for one cycle being twenty-four hours. In my improved kiln, when employing the checker work combustion chambers on the conveyor above referred to, I have found it desirable and advantageous to give the conveyor an intermittent or step-by-step travel so timed that during the pause periods of the conveyor the combustion chambers will be respectively directly opposite the gas burners or hot air inlet pipes. This, manifestly, effects a more uniform dispersion of the hot products of combustion or heated air throughout the baking area, as well as preventing localization of the heated jets on the ware with possible discoloration of the latter and other objectionable effects.

In my former Patent 1,903,117, I have disclosed a heat economy feature comprising means by which hot air from the cooling zone is conducted into the pre-heating zone. The kiln of the present invention preferably employs this same feature, but in an improved and more efficient form, by which the hot air from the cooling zone is more efficiently drawn from the latter and is more uniformly distributed through the pre-heating zone and through the body of ware on the conveyor; and this latter result I accomplish by providing means for creating a continuous recirculation of hot air between the floor of the conveyor and the top of the tunnel, such air flowing upwardly through the body of ware on the conveyor.

Another object of the invention is to provide a construction affording greater flexibility of temperature in the cooling zone of the kiln and a more rapid and uniform cooling of the ware; and this is accomplished by the provision of means for forcing external air at one or more points through lateral openings in the side walls of the cooling zone directly against the ware on the conveyor.

A further object of the invention has been to provide a fully automatic means for effecting and controlling the intermittent travel of the conveyor throughout the kiln; the preferred means hereinafter described consisting in electric motors for driving the conveyor, and a circuit switch system by which the conveyor is automatically stopped as the combustion chambers on the conveyor come directly opposite the inlet pipes or nozzles of the heating medium, and is again started up at the end of a predetermined pause period.

Heretofore, so far as I am aware, it has been the practice in tunnel kilns of this type to increase the width of the tunnel by laterally offsetting the side walls of the tunnel throughout the longitudinal dimension of the firing zone. An example of this is shown in my two patents above identified. This necessarily limits the length of the firing zone that can be employed in any tunnel kiln without necessitating extensive alterations and partial rebuilding to either shorten or lengthen the firing zone. Another object of this invention has been to provide a tunnel kiln structure wherein the length of the firing zone may be easily varied without requiring any alterations or partial rebuilding of the tunnel walls; and this object I accomplish by building the tunnel of uniform width throughout, and equipping the side walls with spaced burners or hot air injectors extending throughout a maximum length of said side walls that in practice will ever be required, so that, if a less length of firing zone is required it can be secured by merely cutting out of service one or more burners at one or both ends of the firing zone.

Still other objects and attendant advantages of the invention will be apparent to persons skilled in the art from the following detailed description, taken in connection with the accompanying drawings, wherein I have illustrated an approved embodiment of the invention, and in which:

Fig. 1 is a plan section of the circular kiln, showing a loading zone, a pre-heating zone, a firing zone, and a cooling zone, all continuous with each other.

Figs. 2, 3 and 4 are continuous developments in vertical section of the pre-heating zone, the firing zone, and the cooling zone, respectively.

Fig. 7 is an enlarged vertical transverse section through the outlet end portion of the cooling zone, on the line 7—7 of Fig. 1.

Fig. 8 is a fragmentary vertical longitudinal section through the roof and upper portion of the outlet end of the cooling zone, on line 8—8 of Fig. 7.

Fig. 9 is a diagram of the circuit and controlling switches of the driving motors of the conveyor.

Fig. 10 is a vertical transverse section through one of the walls on the line 10—10 of Fig. 1.

Figure 5:
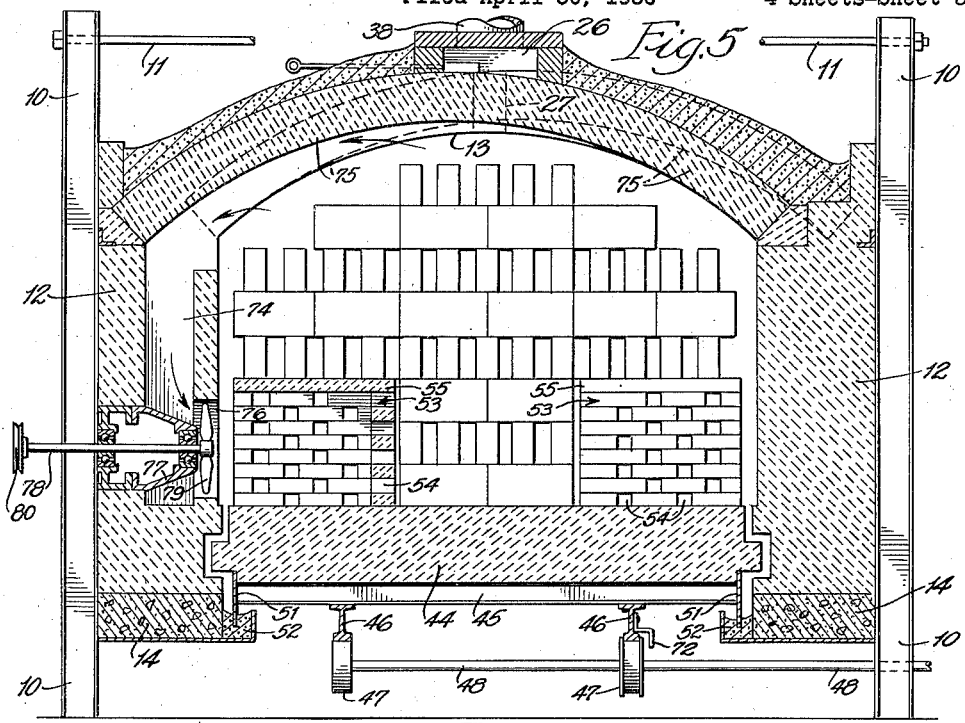
Fig. 5 is an enlarged vertical transverse section through the pre-heating zone, on the line 5—5 of Fig. 1.

In the construction illustrated, the kiln is of the circular type and comprises a fabricated metal frame structure supported on a concrete foundation (not shown) and including outer and inner rows of spaced vertical I-beams 10 connected at their upper ends by tie rods 11, and side walls 12 and an arched roof 13, all supported on concrete floor slabs 14. These side walls and roof surround the tunnel passage and are made of various heat-resisting materials, such as brick, fire brick, tile, refractory, infusorial earth, and similar materials. By reference to Fig. 1 it will be observed that the side walls of the tunnel are uniformly spaced throughout its entire length.

In the construction shown, the tunnel forms and defines a pre-heating zone extending between the points A and B (Fig. 1), a firing zone extending between the points B and C and occupying approximately one-half of the total length of the tunnel, and a cooling zone extending between the points C and D. Between the points D and A is a loading and unloading station E.

Air is continuously driven through the ware passage counter to the direction of the travel of the ware by means of a blower 15, the discharge pipes 15' of which communicate with a vertical group of recesses 16 in the inner sides of the side walls of the cooling zone adjacent to the outlet end of the tunnel, as illustrated in Figs. 1, 4 and 7. The flow of air through the recesses 16 may be varied by damper valves 17 (Fig. 7) operable by external handles 18. As shown in Figs. 1 and 7, the several recesses 16 all communicate with a vertical passage 19 directly supplied by the blower, which passage 19 communicates at its upper end with a transverse passage 20 in the roof 13, and this passage 20, as shown in Figs. 4 and 8, communicates through a central duct 21 with the top portion of the tunnel space beneath the roof, so that the air is blown into the exit end of the tunnel from both the side walls and the roof.

Describing now the structural features of the pre-heating zone of the tunnel, which is shown in horizontal longitudinal section in Fig. 1, in vertical longitudinal section in Fig. 2, and in vertical transverse section in Figs. 5 and 10, the portions of the side walls near the entrance end are formed with longitudinally extending chambers 22 that communicate at spaced intervals along their lower edges through ports 23 with the interior tunnel space, and the openings of these ports to the passage 22 are regulated by damper valves 24 (Fig. 10) actuated from the outside by handles 25.

Extending longitudinally of the roof of the pre-heating zone is a chamber 26 that communicates at spaced intervals with the interior of the tunnel space through a group of ducts 27, all of which are inclined downwardly and forwardly in the direction of travel of the conveyor, this air flowing thence through and around the ware on the conveyor and being drawn off through the ports 23 and chambers 22 by an exhaust fan 28 (Fig. 1), the suction side of which communicates with the chambers 22.

In tunnel kilns, the hot gases have a tendency to drift along the roof toward the ware inlet opening of the pre-heating zone with the result that the heat is not evenly distributed. This tendency of the hot gases to drift along the roof is counteracted by the flow of air which is injected into the pre-heating zone through the ducts 27 in a direction which is directly opposed to the drift of hot gases through the tunnel.

Figure 6:
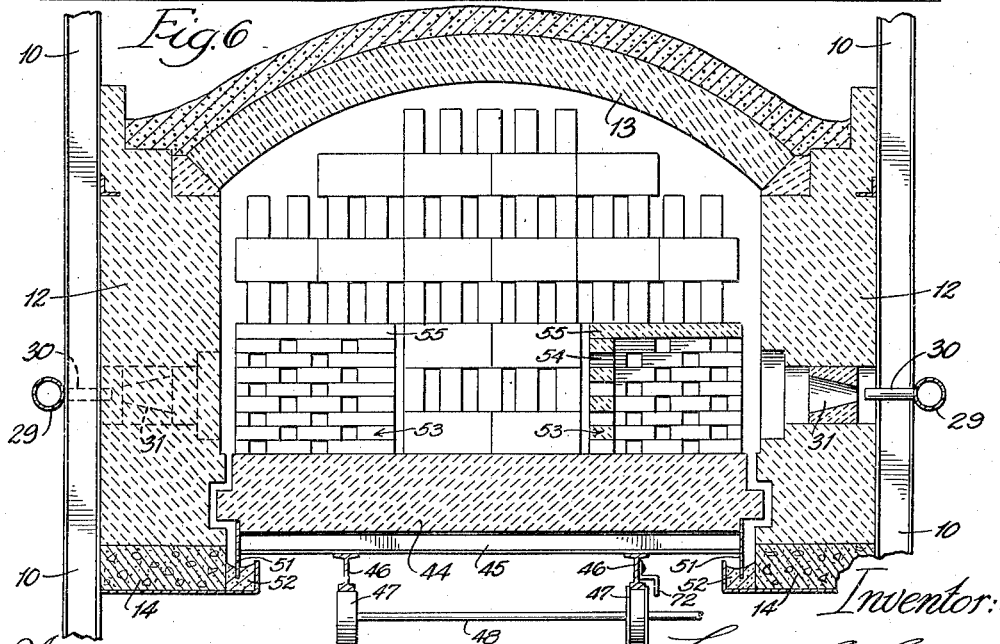
Fig. 6 is an enlarged vertical transverse section through the firing zone on the line 6—6 of Fig. 1.

The firing zone is shown in horizontal longitudinal section in Fig. 1, in vertical longitudinal section in Fig. 3, and in vertical transverse section in Fig. 6. Along the outer and inner sides of this firing zone, and mounted on the uprights 10, are gas manifolds 29, from which, at intervals, valve-controlled burner pipes 30 direct the burning gas and products of combustion, mingled with air, through a Venturi tube 31 into the sides of the tunnel chamber. Air is supplied to the burners by a blower 32 (Fig. 1), and main and branch pipes therefrom to the individual burners.

The cooling zone is shown in horizontal longitudinal section in Fig. 1, in vertical longitudinal section in Fig. 4, and in vertical transverse section in Fig. 7. The structural features of this section of the tunnel, by which air is blown through the tunnel contrary to the direction of travel of the conveyor and ware, have been described above. Extending longitudinally of the roof are two chambers 33 and 34 separated by a partition 35. In the bottom wall of the chamber 33 are a group of spaced ducts 36 communicating with the tunnel space and inclined toward the ware exit end; and in the bottom wall of the chamber 34 are a plurality of similar but oppositely inclined ducts 37. A hot air transfer pipe 38 communicates at one end with the chamber 33 in the roof of the cooling zone and at its other end with the chamber 26 in the roof of the pre-heating zone, and in this pipe 38 is interposed a blower 39 which sucks hot air from the chamber 33 of the cooling zone and delivers it to the chamber 26 of the pre-heating zone.

After the ware leaves the firing zone, it may be quickly cooled to a point below the vitrification point, but thereafter should be cooled more gradually to prevent cracking. In Fig. 4 is shown an accessory associated with the cooling zone of the tunnel by which the cooling of the ware to below the vitrification point may be effected more or less rapidly. This device consists of a blower 40 having a branched suction end, one of the branches 41 communicating with the chamber 33 and the other branch 42 communicating directly with atmosphere and controlled by a damper valve 43. If a more rapid cooling of the ware in the receiving end portion of the cooling zone is desired, the valve 43 is opened so that outside air mingles with warm air from the chamber 33 and is discharged through chamber 34 and ducts 37 into the receiving end of the cooling chamber. If a slower cooling is desired or required, the valve 43 is closed, and the blower 40 merely transfers the internal warm air from the outer end portion to the inner end portion of the cooling zone.

Describing next the conveyor and the combustion chambers carried thereby, 44 designates a heavy annular slab or series of slabs of refractory material mounted and supported at intervals on cross beams 45 in turn resting on I-beam rails 46 which travel on wheels 47, certain of which wheels are mounted on drive shafts 48 (Figs. 1 and 5). The shafts 48 are driven by electric motors 49 and speed-reducing gearing 50 to thereby impart rotation to the conveyor 44. The sides of the conveyor are equipped with the usual depending aprons 51 traveling in sand troughs 52 attached to the inner sides of the concrete floor slabs 14; this being a commonly employed means for preventing the high heat from the tunnel chamber reaching down into the underlying space containing the conveyor supporting and driving mechanism.

Coming now to a feature of the invention which is of primary importance, mounted on the annular conveyor slab 44 are outer and inner circular groups of uniformly spaced combustion chambers 53, the units of one row being in staggered relation to the units of the other row, as shown in Fig. 1.

As best shown in the enlarged sectional views Figs. 5, 6, 7 and 9, each of these combustion chambers 53 is of rectangular form with its side walls 54 made of fire brick or similar refractory material in checker or open work form; each unit preferably having a solid or imperforate top wall or cover 55. As shown in Fig. 1, the spacing of these units is the same as the spacing of the burner nozzles.

The conveyor is given an intermittent or step-by-step movement, each movement sufficing to carry a combustion chamber from a point opposite one burner nozzle to a point opposite the next burner nozzle, and so on. This intermittent movement is automatically effected by a control of the drive motors 49, that is diagrammatically illustrated in Fig. 9. Here the battery of six motors 49 is connected to main leads 56 and 57 from a source of current by branch lines 58 and 59 respectively. In the line 59 is interposed a switch designated as an entirety by F, the function of which is to start the motors; and in the same line 59 is interposed a second switch designated as an entirety by G, the function of which is to deenergize the motors and arrest the movement of the conveyor. Switch F, in the form shown, comprises a fixed terminal 60 wired to one limb of line 59 and a movable terminal 61 wired to a parallel limb of the same line. The terminal 61 is carried by one end of a lever 62 pivoted at 63 and carrying on its free end a roller 64 that rides on the periphery of a continuously rotating spiral timing cam 65. The pivot 63 of the lever is connected into the side of the line 59 shown as passing therethrough. A spring 66 holds the roller 64 in contact with the periphery of the rotating cam 65.

The switch G, in the form herein shown, comprises a fixed terminal 67 wired to one limb of the line 59 and a movable cooperating terminal 68 connected to the other limb. The terminal 68 is carried by one end of a lever 69 pivoted on a pin 70 to which one limb of the line 59 is wired and carrying at its other end a roller 71 that lies in the path of a plurality of cams 72, each of said cams being attached to one of the conveyor rails 46 at a point centrally beneath a combustion chamber on the conveyor. The lever 69 is urged to switch-closing position by a spring 73.

Describing the operation of this automatic motor control mechanism, as above stated switch F is a motor-starting switch and switch G is a normally closed motor-stopping switch which is opened only when the switch F is open. With switch F open, as shown in Fig. 9, the motor circuit is normally held closed through switch G by spring 73, but as soon as cam 72 strikes roller 71, switch G is opened, as shown in Fig. 9, thus stopping the motors, which remain idle until roller 64 of switch F reaches and drops off the peak of rotary timing cam 65, which closes the motor circuit through switch F, starting the motors and conveyor, and holds it closed until cam 72 has ridden off roller 71, whereupon the circuit is closed through switch G and held closed until it is again opened by the next succeeding cam 72 striking the roller 71 and again opening the circuit, which remains open until roller 64 of switch F again drops off the peak of rotary cam 65, again closing the circuit through switch F and so again starting the motors and conveyor.

This double switch arrangement insures the stopping of the conveyor with the combustion chambers centrally opposite the burners, and makes it unnecessary to exactly shape and time the rotary cam 65 so as to perform both functions of stopping and starting the motors.

Referring once more to the pre-heating zone of the kiln, with a view to effecting a more thorough contact of the interior parts of the load by the hot air and gases, I may form in the side walls 12 spaced vertical ducts 74 (Figs. 1, 2 and 5) that communicate at their upper ends, preferably through transverse grooves or channels 75 in the lower surface of the roof 13, with the top of the tunnel space, and at their lower ends through ports 76 with the bottom portion of the tunnel space above the conveyor 44. In the walls 12 opposite each port 76 is mounted a bearing member 77 for the shaft 78 of a propeller fan 79 located in port 76. On the outer ends of shafts 78 are pulleys 80 indicating a means for driving the fans 79. The fans 79 are so spaced as to lie opposite the combustion chambers 53 on the conveyor during the pauses in the travel of the latter. By this means a continuous closed circulation of hot air and gases is maintained through the load of ware from bottom to top in a general direction between the transverse center and both sides of the load, so that the hot air and gases thoroughly penetrate and permeate the load as the latter passes the fans 79, and the entire body of ware is evenly and uniformly preheated.

A somewhat similar auxiliary device may usefully be employed in the cooling zone of the kiln to distribute the cooling air evenly and uniformly through the body of ware and effect a more rapid cooling just before the unloading zone is reached. Referring to Figs. 1 and 4, in the side walls of the kiln, at points opposite the pause points of the combustion chambers 53, are formed ports 81 in which are mounted propeller fans 82 that direct currents of outside air directly into the combustion chambers, whence the air is dispersed laterally into the interior of the load on the conveyor. This device can be used either with or in lieu of the blower 40 (Fig. 4) to accelerate the cooling action in the cooling zone of the kiln.

In operation, the conveyor moves intermittently, as above described, and it is loaded and unloaded at the open zone or loading station E of the kiln, the pauses in the conveyor travel affording ample time for loading and unloading. The conveyor travels clockwise in the direction of the arrow shown in Fig. 1 for moving the ware successively through the pre-heating zone, the firing zone, and the cooling zone. The blower 15 causes a continuous flow of air through the ware passage against the travel of the ware, carrying heat from the cooling and firing zones into the pre-heating zone.

As the ware travels first through the pre-heating zone A—B, it is gradually heated by the hot air which drifts through the tunnel from the firing zone and also by the hot air which is transferred by pipe 38 and blower 39 from the cooling zone to the pre-heating zone, this hot air being uniformly distributed to the heating chamber of the pre-heating zone through the spaced ducts 27 and recirculated therein through the body of ware by the fans 79. The temperature in the pre-heating zone is regulated by the exhaust fan 28 which may be operated to draw off more or less of the hot air as conditions may require.

The ware is, of course, subjected to the maximum heat as it travels through the firing zone B—C. In this zone the ware is subjected not only to the high heat of the combustion gases which are widely dispersed laterally through the openings of the perforated combustion chambers, but also to the radiant heat of these chambers, which become intensely hot. As shown in the sectional views, Figs. 5, 6 and 7, the ware being treated may be distributed both between and above the combustion chambers, so that the ware in the lower portion of the tunnel chamber is first subjected to the maximum heat and the ware in the upper portion is subjected to the heat rising from the lower portion. Thus, the lower portion of the body of ware is not under-heated, and a substantially uniform heating prevails throughout the entire body of the ware. The degree of heat attained in the firing zone may, of course, be regulated both by regulation of the volume of gas admitted to the burners and by the volume of external air driven through the tunnel by the blower 15, the volume of this air being regulated by the dampers 17 at the exit of the cooling chamber.

By reason of the fact that the firing zone involves no special construction or spacing of its side walls, the length and also the position of the firing zone may be varied, within the maximum limit of the burner equipment by either cutting in or out one or more burners at either end of the series, thus affording a very desirable flexibility in the firing of the ware.

As the ware travels finally through the cooling zone, the degree and speed of cooling may be regulated partly by the volume of external air forced through it by the blower 15, partly by the amount of heated air withdrawn and transferred to the pre-heating chamber, which may be regulated by the valves 24, and partly by the blower 40 and fans 82 which, as described, may admit more or less external air to the cooling zone.

With this kiln, the ware may be pre-heated, fired and cooled without cracking, and with much greater safety and uniformity in the product owing to the greater uniformity in the application of the heat to the ware than has heretofore been possible with kilns of this general type.

Although but one specific embodiment of this invention has been herein shown and described, it will be understood that details of the construction shown may be altered without departing from the substance and spirit of the invention as defined by the following claims.

I claim:

1. A tunnel kiln having a ware passage, a ware conveyor movable through said passage, a plurality of rows of spaced combustion chambers on said conveyor, said chambers having perforated walls and the chambers of each row being staggered relatively to the chambers of an adjacent row, and means for directing hot gases into said chambers.

2. A tunnel kiln having a ware passage, a ware conveyor movable through said passage, spaced combustion chambers on said conveyor permitting the loading of ware on the floor of the conveyor between adjacent chambers, said chambers having perforated side walls and imperforate top walls, and means for directing hot gases into said chambers through the side walls of said passage.

3. A tunnel kiln having a ware passage, spaced burners in the side walls of said passage, a ware conveyor mounted to travel through said passage, spaced combustion chambers mounted on the floor of said conveyor permitting the loading of ware on the floor of the conveyor between adjacent chambers, and means for effecting an intermittent travel of said conveyor through said passage, said means including means for arresting the travel of the conveyor for a predetermined period when said chambers are opposite said burners.

4. A tunnel kiln having a ware passage, spaced burners in the side walls of said passage, the burners on one side being staggered relatively to the burners on the other side, a ware conveyor mounted to travel through said passage, rows of spaced combustion chambers having perforated side walls on the edge portions respectively of said conveyor, and means for effecting an intermittent travel of said conveyor through said passage, said means including means for arresting the travel of the conveyor for a predetermined period when said chambers are opposite said burners.

5. A tunnel kiln having a ware passage comprising a pre-heating zone, a cooling zone, and a firing zone between said pre-heating and cooling zones, said pre-heating zone having a longitudinal chamber in its roof and spaced ducts in its bottom wall inclined downwardly away from the entrance end of said pre-heating zone and communicating with said passage, a ware conveyor movable through said passage, means for forcing air through said ware passage counter to the direction of travel of said conveyor, a pipe communicating at one end with said roof chamber of the pre-heating zone and at its other end with the roof portion of said cooling zone, and means interposed in said pipe for moving hot air from said cooling zone to said pre-heating zone.

6. A tunnel kiln having a ware passage comprising a pre-heating zone, a cooling zone, and a firing zone between said pre-heating and cooling zones, said cooling zone having a longitudinal chamber in its roof communicating through spaced ducts with said passage, a ware conveyor movable through said passage, means for forcing air through said passage counter to the direction of travel of said conveyor, a pipe communicating at one end with said roof chamber of the cooling zone and at its other end with said pre-heating zone, and means interposed in said pipe for moving hot air from said cooling zone to said pre-heating zone.

7. A tunnel kiln having a ware passage comprising a pre-heating zone, a cooling zone, and a firing zone between said pre-heating and cooling zones, said cooling zone having a longitudinal chamber in its roof and spaced ducts in its bottom wall inclined upwardly away from the exit end of said cooling zone and communicating with said passage, a ware conveyor movable through said passage, means for forcing air through said passage counter to the direction of travel of said conveyor, a pipe communicating at one end with said roof chamber of the cooling zone and at its other end with said pre-heating zone, and means interposed in said pipe for moving hot air from said cooling zone to said pre-heating zone.

8. A tunnel kiln having a ware passage comprising a pre-heating zone, a cooling zone, and a firing zone between said pre-heating and cooling zones, said pre-heating and cooling zones each having a longitudinal chamber in its roof communicating through spaced ducts with said passage, a ware conveyor movable through said passage, means for forcing air through said passage counter to the direction of travel of said conveyor, a pipe communicating at its ends with said roof chambers respectively, and a blower interposed in said pipe for moving hot air from said cooling zone to said pre-heating zone.

9. A tunnel kiln having a ware passage comprising a pre-heating zone, a cooling zone, and a firing zone between said pre-heating and cooling zones, said pre-heating zone having a longitudinal chamber in its roof and spaced ducts in the bottom wall of said chamber inclined downwardly away from the entrance end of said pre-heating zone and communicating with said passage, said cooling zone having a longitudinal chamber in its roof and spaced ducts in the bottom wall of said chamber inclined upwardly away from the exit end of said cooling zone and communicating with said passage, a ware conveyor movable through said passage, means for forcing air through said passage counter to the direction of travel of said conveyor, a pipe communicating at one end with said roof chamber of the cooling zone and at its other end with said roof chamber of the pre-heating zone, and a blower interposed in said pipe for moving hot air from said cooling zone to said pre-heating zone.

10. In a circular tunnel kiln, the combination of a circular ware conveyor mounted to travel through said kiln, burners in the side walls of the firing zone of said kiln, combustion chambers on said conveyor spaced according to the spacing of said burners, and means for effecting an intermittent travel of said conveyor to bring said combustion chambers directly opposite said burners comprising an electric motor for driving said conveyor, and automatic switch mechanism in the circuit of said motor operative to arrest the travel of the conveyor when said combustion chambers are opposite said burners to maintain it idle for a predetermined period and to again advance the conveyor one step.

11. In a circular tunnel kiln, the combination of a circular ware conveyor mounted to travel through said kiln, burners in the side walls of the firing zone of said kiln, combustion chambers on said conveyor spaced according to the spacing of said burners, and means for effecting an intermittent travel of said conveyor to bring said combustion chambers directly opposite said burners comprising an electric motor for driving said conveyor, a spring-closed motor-stopping switch in the circuit of said motor, cams on said conveyor for opening said switch, said cams being spaced according to the spacing of said combustion chambers, a spring-closed motor-starting switch in the circuit of said motor, and a continuously moving cam operative to periodically permit said last-named switch to close at a predetermined time after the motor circuit has been opened at said first-named switch.

12. A tunnel kiln having a ware passage, a ware conveyor movable through said passage, spaced combustion chambers on the floor of said conveyor defining therebetween a space on the floor of said conveyor, thereby permitting the loading of ware on said floor between adjacent chambers, said chambers having perforated side walls, and means for directing hot gases into said chambers.

LESTER L. LADD.